US008292279B2

(12) United States Patent
Zhang

(10) Patent No.: US 8,292,279 B2
(45) Date of Patent: Oct. 23, 2012

(54) CLAMP

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/610,349

(22) Filed: Nov. 2, 2009

(65) Prior Publication Data

US 2011/0024962 A1 Feb. 3, 2011

(30) Foreign Application Priority Data

Jul. 29, 2009 (CN) .......................... 2009 1 0304943

(51) Int. Cl.

| | |
|---|---|
| ***B25B 1/20*** | (2006.01) |
| ***B25B 5/14*** | (2006.01) |
| ***B25B 1/06*** | (2006.01) |
| ***B23Q 3/02*** | (2006.01) |

(52) U.S. Cl. .... 269/107; 269/41; 269/133; 269/254 CS; 269/111

(58) Field of Classification Search .................. 269/107, 269/111, 254 CS, 3, 6, 43, 45, 71, 95, 143, 269/249, 60
See application file for complete search history.

(56) References Cited

U.S. PATENT DOCUMENTS

| | | | | |
|---|---|---|---|---|
| 2,605,795 | A * | 8/1952 | Tracy | 269/133 |
| 4,821,393 | A * | 4/1989 | Spigarelli | 29/283 |
| 5,308,582 | A * | 5/1994 | Serra | 422/565 |
| 5,557,833 | A * | 9/1996 | Pool | 29/261 |
| 2002/0101015 | A1* | 8/2002 | Holbrook | 269/41 |

* cited by examiner

*Primary Examiner* — Monica Carter
*Assistant Examiner* — Seahee Yoon
(74) *Attorney, Agent, or Firm* — Altis Law Group, Inc.

(57) ABSTRACT

The present disclosure provides a clamp including a base with a holding surface, a first movable element, a second movable element opposite to the first movable element, and a third movable element with two arms opposite to each other. The first, the second, and the third movable elements are mounted on the holding surface of the base, and are slidable relative to the holding surface. Each arm defines a slope face the slope of the other arm. The first and the second movable elements are located between the two arms. The first movable element is resisted one of slope, and the second movable element is resisted the other of the slope. When the third movable element moves, the two slopes move relative to the first and the second movable elements, and the first and the second movable elements move toward or away from each other.

19 Claims, 2 Drawing Sheets

CLAMP

BACKGROUND

1. Technical Field

The present disclosure relates to clamps and, particularly, to a clamp with two opposite movable jaws for holding a workpiece.

2. Description of Related Art

A clamp usually has a fixed member and a movable member opposite to the fixed member. The movable member is movable relative to the fixed member. When clamping a workpiece, the movable member is configured to push the workpiece towards the fixed member, and clamp the workpiece together with the fixed member. Because the workpiece is driven to move from one side when the clamp holds a number of workpieces of different sizes, the center of the workpieces will be at different positions relative to the clamp, making machining the workpieces difficult and complicated.

What is needed, therefore, is a clamp capable of positioning the workpiece while overcoming the above-described problem.

BRIEF DESCRIPTION OF THE DRAWINGS

Many aspects of the present clamp can be better understood with reference to the following drawings. The components in the drawings are not necessarily drawn to scale, the emphasis instead being placed upon clearly illustrating the principles of the clamp.

DETAILED DESCRIPTION

Embodiments of the present disclosure will now be described in detail below, with reference to the accompanying drawings.

Figure 1:
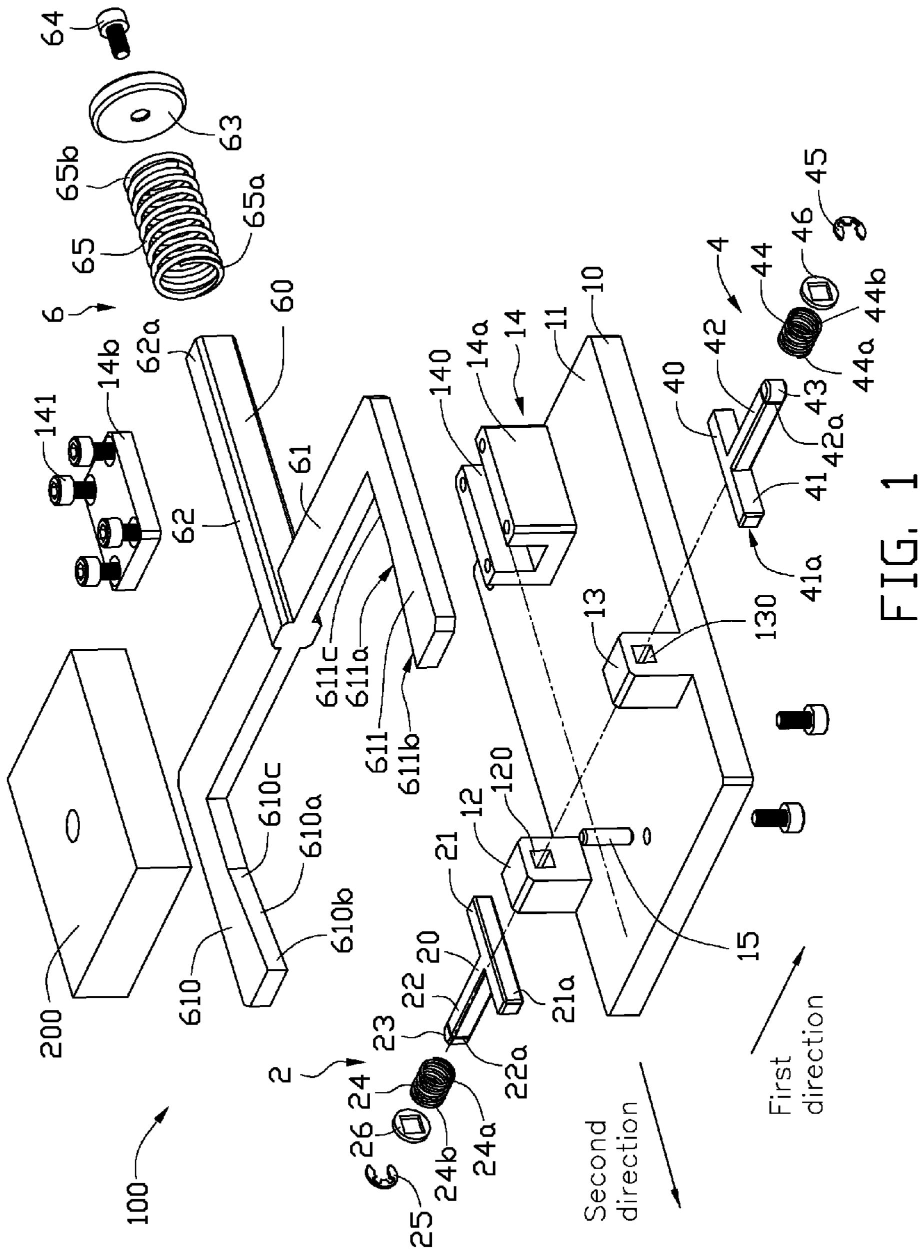
FIG. 1 is an exploded view of a clamp according to an exemplary embodiment.
Figure 2:
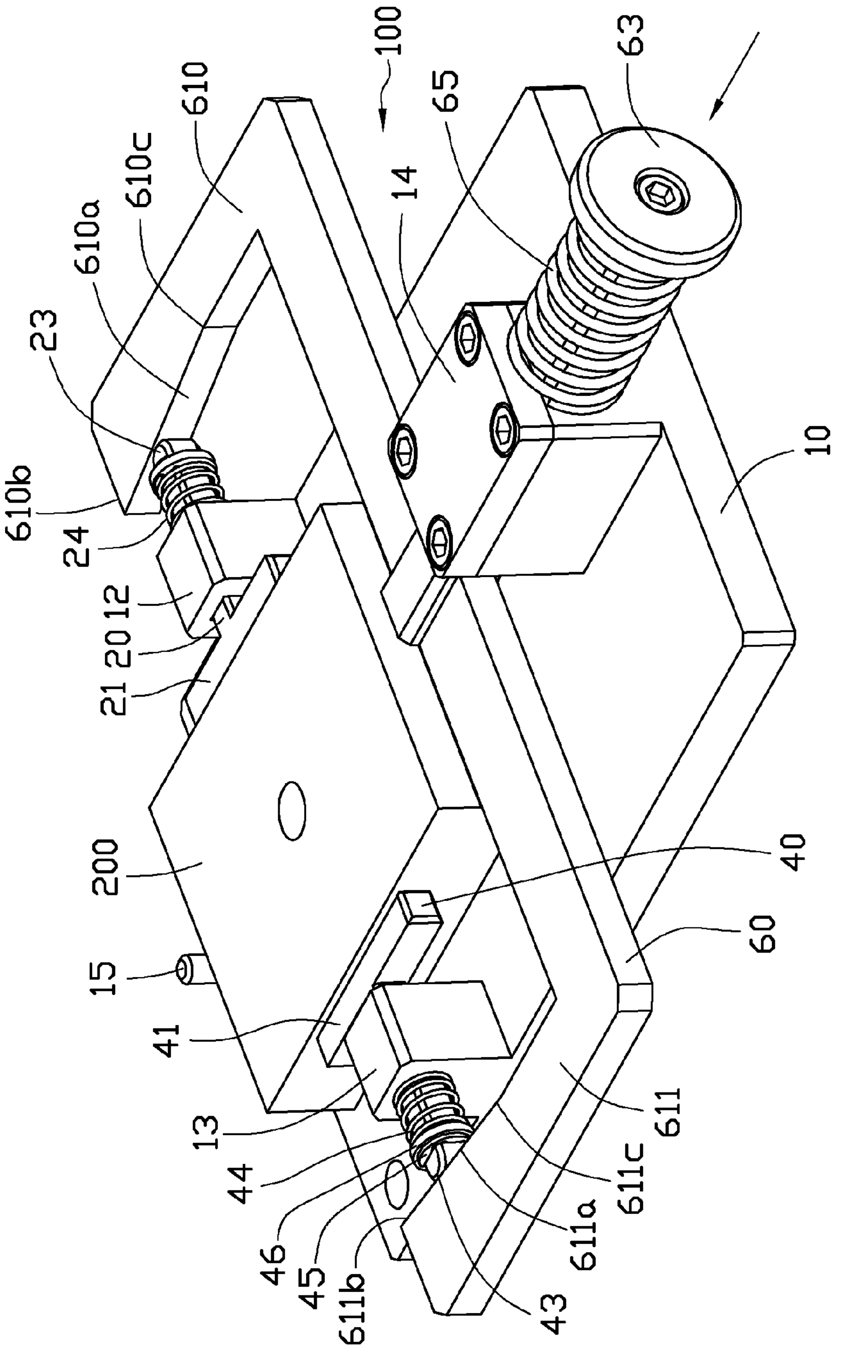
FIG. 2 is an assembled, isometric view of the clamp of FIG. 1.

Referring to FIGS. 1 and 2, a clamp 100, according to an exemplary embodiment, is shown. A workpiece 200 is held by the clamp 100. The clamp 100 includes a base 10, a first claw assembly 2, a second claw assembly 4, and an operation assembly 6.

The base 10 includes a holding surface 11, a first guiding portion 12, a second guiding portion 13, a third guiding portion 14, and a positioning pin 15.

The first guiding portion 12 is disposed on the holding surface 11 and defines a first guide hole 120. In the present embodiment, the first guide hole 120 is a rectangular hole. The second guiding portion 13 is disposed on the holding surface 11, and is opposite to the first guiding portion 12. The second guiding portion 13 defines a second guide hole 130. In the present embodiment, the second guide hole 130 is a rectangular hole. The first guide hole 120 is coaxial to the second guide hole 130. The third guiding portion 14 includes a main body **14*a* and a cover 14*b*. The main body 14*a* is disposed on the holding surface 11. The cover 14*b* is fixed on the main body 14*a* through a number of screws 141. The main body 14*a* and the cover 14*b* cooperatively define a third guide hole 140. The third guide hole 140 is a rectangular hole. The center axis of the third guide hole 140 is perpendicular to that of the first guide hole 120 and the second guide hole 130. The center axis of the first guide hole 120, the second guide hole 130, and the third guide hole 140 are parallel to the holding surface 11. In the present embodiment, the first guiding portion 12 and the second guiding portion 13 are distributed symmetrically at two opposite sides of the center axis of the third guide hole 140**.

The positioning pin 15 for positioning the workpiece 200 is disposed on the holding surface 11. The positioning pin 15 is disposed opposite to the third guiding portion 14, and is located on the center axis of the third guide hole 140.

The first claw assembly 2 includes a first movable element 20, a first elastic element 24, a first circlip 25, and a first gasket 26. The first movable element 20 is in a T-shaped configuration. The first movable element 20 includes a first pressing portion 21, a first shaft portion 22, and a first resisting portion 23. The first pressing portion 21 is disposed at an end of the first shaft portion 22 facing the second guiding portion 13. The first pressing portion 21 includes a first pressing surface **21*a* formed at an end away from the first shaft portion 22. The first pressing surface 21*a* can be a planar surface or a curved surface. In the present embodiment, the first pressing surface 21*a* is a planar surface. The first shaft portion 22 runs through the first guide hole 120, and is slidable along the first guide hole 120. The first shaft portion 22 includes a first notch 22*a* formed at an end adjacent to the first resisting portion 23. The first resisting portion 23 is located at the other end of the first shaft portion 22 away from the second guiding portion 13. In the present embodiment, the first resisting portion 23 is a cylindrical surface. When the workpiece 200 is clamped between the first claw assembly 2 and the second claw assembly 4, the first pressing surface 21*a* resists against the workpiece 200**.

The first elastic element 24 is sleeved around the first shaft portion 22. In the present embodiment, the first elastic element 24 is a spring. The first elastic element 24 includes a first resisting end **24*a* and a second resisting end 24*b* opposite to the first resisting end 24*a*. In the present embodiment, the first circlip 25 is fastened at the first notch 22*a*. The first gasket 26 is sleeved around the first shaft portion 22 between the first circlip 25 and the first elastic element 24. When the first shaft portion 22 is slidably received in the first guide hole 120, the first resisting end 24*a* resists on the first guiding portion 12, while the second resisting end 24*b* resists on the first circlip 25 via the first gasket 26**.

The configuration of the second claw assembly 4 is absolutely same as the configuration of the first claw assembly 2. The second claw assembly 4 includes a second movable element 40, a second elastic element 44, a second circlip 45, and a second gasket 46. The second movable element 40 includes a second pressing portion 41, a second shaft portion 42, and a second resisting portion 43. The second pressing portion 41 and the second resisting portion 43 are formed at two end of the second shaft portion 42. The second pressing portion 41 includes a second pressing surface **41*a* using for resisting against the workpiece 200. The second shaft portion 42 runs through the second guide hole 130. The second shaft portion 42 includes a second notch 42*a* near the second resisting portion 43**.

The second elastic element 44 is sleeved around the second shaft portion 42. The second elastic element 44 includes a third resisting end **44*a* and a fourth resisting end 44*b* opposite to the third resisting end 44*a*. In the present embodiment, the second circlip 45 is fastened at the second notch 42*a*. The second gasket 46 is sleeved around the second shaft portion 42 between the second circlip 45 and the second elastic element 44**.

The operation assembly 6 includes a third slide element 60, a third elastic element 65, and a button 63. The third slide element 60 has a Y-shaped configuration. The third slide element 60 includes a third pressing portion 61 and a third shaft portion 62.

The third pressing portion 61 is disposed at an end of the third shaft portion 62 facing the positioning pin 15. The third pressing portion 61 includes a first arm 610 and a second arm 611 opposite to the first arm 610. The first arm 610 includes a first slope 610*a* facing the second arm 611. The first slope 610*a* includes a first end 610*c* adjacent to the third shaft portion 62 and a second end 610*b* away from the first end 610*c*. The second arm 611 includes a second slope 611*a* opposite to the first arm 610. The second slope 611*a* facing the first slope 610*a*. The second slope 611*a* includes a third end 611*c* adjacent to the third shaft portion 62 and a fourth end 611*b* opposite to the third end 611*c*. When the workpiece 200 is clamped between the first movable element 20 and the second movable element 40, the first resisting portion 23 resists against the first slope 610*a*, while the second resisting portion 43 resists against the second slope 611*a*. In the present embodiment, the distance between the first end 610*c* and the third end 611*c* is longer than that of between the second end 610*b* and the fourth end 611*b*. The distance between the first end 610*c* and the third end 611*c* can also be shorter than the distance between the second end 610*b* and the fourth end 611*b*.

The third shaft portion 62 runs through the third guide hole 140, and is slidable along the third guide hole 140. The button 63 is fixed on a distal end 62*a* of the third shaft portion 62 away from the third pressing portion 61 through a screw 64.

The third elastic element 65 is sleeved around the third shaft portion 62. In the present embodiment, the third elastic element 65 is a spring. The third elastic element 65 includes a fifth resisting end 65*a* and a sixth resisting end 65*b* opposite to the fifth resisting end 65*a*. When the third shaft portion 62 runs through the third guide hole 140, the fifth resisting end 65*a* resists on the third guiding portion 14, and the sixth resisting end 65*b* resists on the button 63. The spring force of the third elastic element 65 is more than the total spring force of the first elastic element 24 and the second elastic element 44.

Before the workpiece 200 is clamped between the first movable element 20 and the second movable element 40, the first slope 610*a* slides relative to the first movable element 20, and the second slope 611*a* slides relative to the second movable element 40. The first elastic element 24 and the second elastic element 44 will urge the first movable element 20 and the second movable element 40, because the distance between the first end 610*c* and the third end 611*c* is longer than of the distance between the second end 610*b* and the fourth end 611*b*.

When the workpiece 200 needs to be clamped between the first movable element 20 and the second movable element 40, the first slope 610*a* slides relative to the first movable element 20, and the second slope 611*a* slides relative to the second movable element 40. The first slope 610*a* and the second slope 611*a* will urge the first movable element 20 and the second movable element 40 until the first movable element 20 and the second movable element 40 force against the workpiece 200, because the distance between the second end 610*b* and the fourth end 611*b* is shorter than that of between the first end 610*c* and the third end 611*c*. The first movable element 20 and the second movable element 40 are capable of moving toward each other simultaneously, when the clamp 100 hold a number of workpieces 200 of different sizes, the center of each of the workpieces 200 will be at a stable position relative to the clamp.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A clamp comprising:
- a base with a holding surface;
- a first movable element slidably mounted on the holding surface of the base, the first movable element sliding along a first direction;
- a second movable element slidably mounted on the holding surface of the base, and formed opposite to the first movable element, the second movable element sliding along the first direction;
- a third movable element slidably mounted on the base, the third movable element sliding along a second direction perpendicular to the first direction, the third movable element comprising:
  - a first arm defining a first slope;
  - a second arm formed opposite to the first arm, the second arm defining a second slope facing the first slope;
- wherein, the first movable element and the second movable element are located between the first arm and the second arm, the first movable element resists against the first slope, and the second movable element resists against the second slope, when the third movable element moves, the first slope and the second slope correspondingly urge the first movable element and the second movable element to move toward or away from each other.

2. The clamp as claimed in claim 1, wherein the first movable element comprises a first pressing portion for resisting against a workpiece, a first resisting portion for resisting against the first slope, and a first shaft portion slidably mounted on the base, the first pressing portion is disposed at an end of the first shaft portion facing the second movable element, and the first resisting portion is located at the other end of the first shaft portion away from the second movable element, the configuration of the second movable element is same as the configuration of the first movable element, the third slide element comprises a third shaft portion, the first arm and the second arm are connected to an end of the third shaft portion.

3. The clamp as claimed in claim 2, wherein the first pressing portion is perpendicular to the first shaft portion to form a T-shaped configuration, the shape of the second movable element is same as the shape of the first movable element.

4. The clamp as claimed in claim 2, wherein the first pressing portion defines a first pressing surface formed at an end away from the first shaft portion, the first pressing surface is configure for resisting against the workpiece.

5. The clamp as claimed in claim 2, wherein first resisting portion is a cylindrical surface.

6. The clamp as claimed in claim 2, wherein the clamp comprises a first elastic element, a second elastic element, and a third elastic element, a first guiding portion disposed on the holding surface, a second guiding portion disposed on the holding surface, and a third guiding portion disposed on the holding surface, the first movable element is slidably mounted on the first guiding portion, the second movable element is slidably mounted on the second guiding portion, the third movable element is slidably mounted on the third guiding portion, the first elastic element is pressed between the first movable element and the first guiding portion, the second elastic element is pressed between the second movable element and the second guiding portion, and third elastic element is pressed between the third movable element and the third guiding portion.

7. The clamp as claimed in claim 6, wherein the first elastic element, the second elastic element, and the third elastic element are springs.

8. The clamp as claimed in claim 7, wherein the first elastic element is sleeved around the first shaft portion, the second elastic element is sleeved around a second shaft portion, the third elastic element is sleeved around the third shaft portion.

9. The clamp as claimed in claim 8, wherein the clamp comprises a first circlip and a second circlip, the first circlip is fastened at the first shaft portion to position the first elastic element, the second circlip is fastened at the second shaft portion to position the second elastic element.

10. The clamp as claimed in claim 2, wherein the clamp comprise a button fixed on a distal end of the third shaft portion away from the first arm and the second arm.

11. The clamp as claimed in claim 1, wherein the first movable element, the second movable element, and the third movable element slide in a plane.

12. The clamp as claimed in claim 1, wherein the clamp comprise a positioning pin disposed on the holding surface, the positioning pin is disposed opposite to the third movable element, and is located on the sliding path of the third movable element.

13. The clamp as claimed in claim 2, wherein the first slope comprises a first end adjacent to the third shaft portion and a second end opposite to the first end, the second slope comprises a third end adjacent to the third shaft portion and a fourth end opposite to the third end.

14. The clamp as claimed in claim 13, wherein the distance between the first end and the third end is longer than that between the second end and the fourth end.

15. A clamp comprising:

a base comprising a holding surface;

a first movable element slidably mounted on the holding surface of the base, the first movable element sliding along a first direction;

a second movable element slidably mounted on the holding surface of the base, and formed opposite to the first movable element, the second movable element sliding along the first direction;

a third movable element slidably mounted on the base, the third movable element sliding along a second direction perpendicular to the first direction, the third movable element comprising:

a first arm defining a first slope;

a second arm formed opposite to the first arm, the second arm defining a second slope facing the first slope; and a positioning pin for positioning a workpiece, the positioning pin disposed on the holding surface and opposite to the third movable element, and is located on a sliding path of the third movable element wherein, the first movable element and the second movable element are located between the first arm and the second arm, the first movable element resists against the first slope, and the second movable element resists against the second slope, when the third movable element moves, the first slope and the second slope move relative to the first and the second movable elements, thereby the first movable element and the second movable element move toward or away from each other.

16. The clamp as claimed in claim 15, wherein the first movable element comprises a first pressing portion for resisting against the workpiece, a first resisting portion for resisting against the first slope, and a first shaft portion slidably mounted on the base, the first pressing portion is disposed at an end of the first shaft portion facing the second movable element, and the first resisting portion is located at the other end of the first shaft portion away from the second movable element, the configuration of the second movable element is same as the configuration of the first movable element, the third slide element comprises a third shaft portion, the first arm and the second arm are connected to an end of the third shaft portion.

17. The clamp as claimed in claim 16, wherein the clamp comprises a first elastic element, a second elastic element, and a third elastic element, a first guiding portion disposed on the holding surface, a second guiding portion disposed on the holding surface, and a third guiding portion disposed on the holding surface, the first movable element is slidably mounted on the first guiding portion, the second movable element is slidably mounted on the second guiding portion, the third movable element is slidably mounted on the third guiding portion, the first elastic element is pressed between the first movable element and the first guiding portion, the second elastic element is pressed between the second movable element and the second guiding portion, and third elastic element is pressed between the third movable element and the third guiding portion.

18. The clamp as claimed in claim 16, wherein the clamp comprises a first circiip and a second circlip, the first circlip is fastened at the first shaft portion to position a first elastic element, the second circlip is fastened at a second shaft portion to position a second elastic element.

19. The clamp as claimed in claim 16, wherein the first slope comprises a first end adjacent to the third shaft portion and a second end opposite to the first end, the second slope comprises a third end adjacent to the third shaft portion and a fourth end opposite to the third end, a distance between the first end and the third end is longer than a distance between the second end and the fourth end.

* * * * *